United States Patent [19]
Wolf et al.

[11] Patent Number: 5,526,843
[45] Date of Patent: Jun. 18, 1996

[54] VENTING VALVE FOR A FUEL TANK

[75] Inventors: Günter Wolf, Oppenweiler; Reinhold Fink, Fellbach, both of Germany

[73] Assignee: Andreas Stihl, Waiblingen, Germany

[21] Appl. No.: 301,191

[22] Filed: Sep. 6, 1994

[30] Foreign Application Priority Data

Sep. 3, 1993 [DE] Germany ............... 43 29 876.1

[51] Int. Cl.[6] .................................................. B01D 35/02
[52] U.S. Cl. ...................... 137/550; 137/854; 137/587
[58] Field of Search ................................ 137/544, 549, 137/550, 587, 854

[56] References Cited

U.S. PATENT DOCUMENTS

| | | | |
|---|---|---|---|
| 230,760 | 8/1880 | Earle | 137/587 |
| 1,924,394 | 8/1933 | Blank | 137/587 |
| 2,016,278 | 10/1935 | Ehlers | 137/549 X |
| 2,270,333 | 1/1942 | Osborn, Jr. | 137/854 |
| 3,983,891 | 10/1976 | Shoemaker | 137/587 X |
| 4,366,836 | 1/1983 | Villari | 137/550 |
| 4,387,736 | 6/1983 | Major | 137/550 |
| 4,401,224 | 8/1983 | Alonso | 137/854 X |
| 4,921,071 | 5/1990 | Lonnborg et al. | 137/587 X |
| 4,946,047 | 8/1990 | Kurokawa et al. | 137/549 X |
| 5,231,982 | 8/1993 | Harrison et al. | 137/854 X |

FOREIGN PATENT DOCUMENTS

| | | |
|---|---|---|
| 1825715 | 1/1961 | Germany . |
| 8322712 | 8/1985 | Germany . |

*Primary Examiner*—John Rivell
*Attorney, Agent, or Firm*—Walter Ottesen

[57] ABSTRACT

The invention relates to a venting valve for a fuel tank and includes a valve seat and a valve body which lies in sealing contact engagement therewith. The sealing surface of the valve seat faces toward the interior space of the tank in order to ensure an operationally-reliable venting even after long periods of operation without the danger of an outflow of fuel. The opening movement of the valve body is directed toward the interior space of the tank. A fine-porous air filter made of sinter material is mounted forward of the valve seat when viewed in flow direction toward the interior of the tank.

16 Claims, 3 Drawing Sheets

VENTING VALVE FOR A FUEL TANK

FIELD OF THE INVENTION

The invention relates to a venting valve for a fuel tank of the a work apparatus driven by an internal combustion engine. The work apparatus can be a motor-driven chain saw or the like.

BACKGROUND OF THE INVENTION

Fuel is continuously drawn from the fuel tank by the internal combustion engine whereby an underpressure can build up above the surface of the fuel in the tank. This underpressure can retard the outflow of the fuel to the engine. An underpressure which builds up in the tank can lead to a quantity of fuel which is so greatly reduced that operational disturbances can occur in the internal combustion engine supplied by the fuel-fed carburetor.

It is known to provide a venting valve or the like for a fuel tank to compensate for the pressure. The venting valve opens when the underpressure exceeds an underpressure limit value so that the underpressure can be reduced by inflowing ambient air. However, it has been shown that dirt particles entrained in the ambient air can lead to a non-tight seating of the valve body on the valve seat. Fuel can leak from the venting valve when the work apparatus is held in certain work positions. This condition not only presents a considerable burden to the operator but also carries with it the danger of fire which should not be underestimated and which can place the operator in considerable danger.

SUMMARY OF THE INVENTION

In view of the foregoing, it is an object of the invention to provide a venting valve for a fuel tank which reliably prevents the leakage of fuel over long periods of operation while at the same time providing a functionally-reliable venting.

The venting valve of the invention is for a fuel tank of a work apparatus such as a chain saw or the like driven by an internal combustion engine. The fuel tank defines an interior and the venting valve includes: a valve seat mounted so as to face into the interior of the tank and defining a sealing surface; a valve body mounted so as to be movable between an open position wherein the interior communicates with the ambient so as to permit air to flow in a flow direction from the ambient into the interior and a closed position wherein the valve body is in seal-tight contact engagement with the sealing surface and the interior is sealed off from the ambient; and, a finely porous air filter mounted in the tank forward of the valve seat when viewed in said flow direction.

The sealing surface of the valve seat faces toward the interior of the tank and the opening movement of the valve body is directed toward the interior space of the tank. A fine-porous air filter is mounted forward of the valve seat in the flow direction toward the interior space of the tank so that the inflowing ambient air is cleaned before it enters the interior space of the tank. In this way, an operationally-reliable venting is provided while guaranteeing that no dirt particles will become lodged between the valve body and the valve seat which would otherwise hinder a liquid-tight closure of the valve body. Even after a long period of operation, an outflow of liquid via the venting valve is substantially precluded.

The valve body and the valve seat are preferably mounted in the interior space of the tank. The valve seat and valve body are preferably provided at one end of a pipe stub projecting into the interior space of the tank while the other end of the pipe stub is fixed to the tank wall. The pipe stub is advantageously configured as one piece with the tank wall. Protection against mechanical damage is guaranteed by the arrangement of the venting valve in the interior space of the tank. Mechanical damage can likewise affect the integrity of the seal.

The air filter is preferably configured as a plug made of an air-permeable sinter material having a permeability such as approximately 100 µm. The plug is preferably configured as a hollow plug. The air filter is preferably force-tightly inserted into the other, open end of the pipe stub. The air filter guarantees a fine filtering of the ambient air. It can be easily exchanged or disassembled for cleaning.

According to a further embodiment of the invention, a filter cap preferably made of the same material is placed over the air filter and defines a kind of prefilter. The filter cap and the air filter conjointly define a hollow space which is provided as a leakage space for fuel which diffuses through the air filter in extreme positions of the work apparatus. The fuel entering into this hollow space vaporizes and is entrained by the throughflowing ambient air in the next pressure compensating operation and is returned to the fuel tank.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
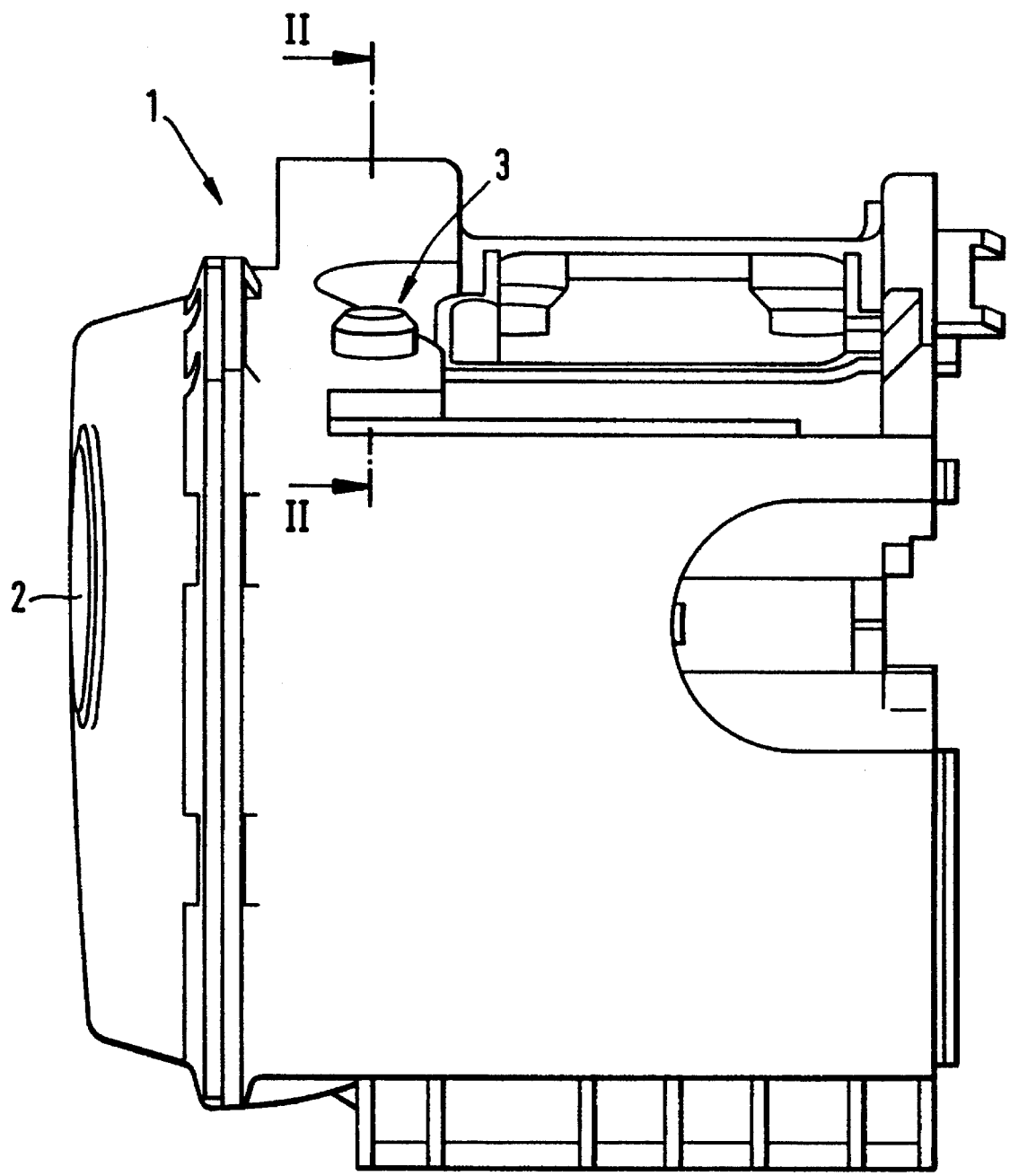
FIG. 1 shows a housing component of a work apparatus having a fuel tank.

The housing component shown in FIG. 1 is made of plastic, aluminum, a die cast material or the like. A fuel tank 1 having a fill opening 2 is configured in the housing component. After closing the fuel opening with a tank cap, the fuel tank 1 is essentially air tight so that an outflow of the fuel is prevented independently of the position of the work apparatus which, for example, can be a motor-driven chain saw.

Figure 2:
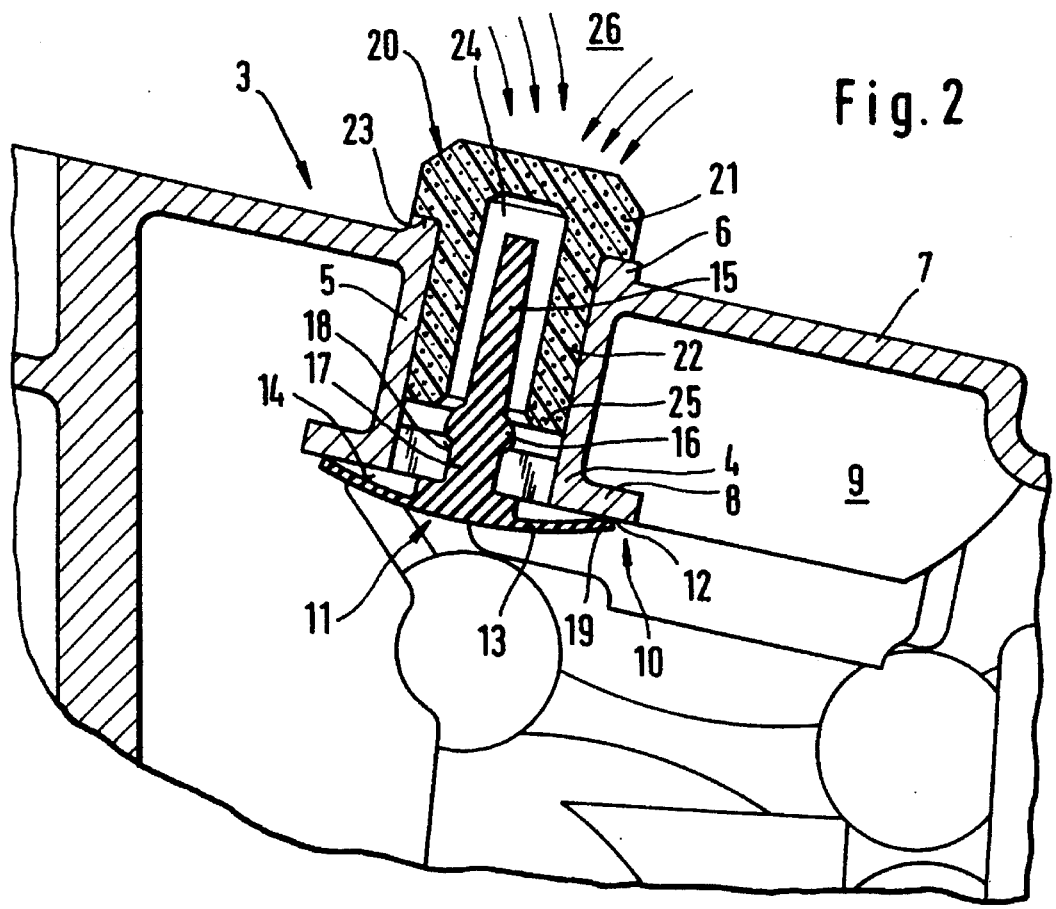
FIG. 2 is a section view taken along line II—II of FIG. 1.

The internal combustion engine which drives work apparatus has used a certain quantity of fuel after a specific duration of operation whereby an underpressure can occur in the fuel tank 1. A venting valve 3 is provided in the wall 7 for venting the fuel tank 1. This venting valve is shown in section in FIG. 2. The venting valve 3 is mounted on the one end 4 of a pipe stub 5 which extends with its other end 6 into the tank wall 7. Preferably, the pipe stub 5 is configured as one piece with the tank wall 7.

Figure 4:
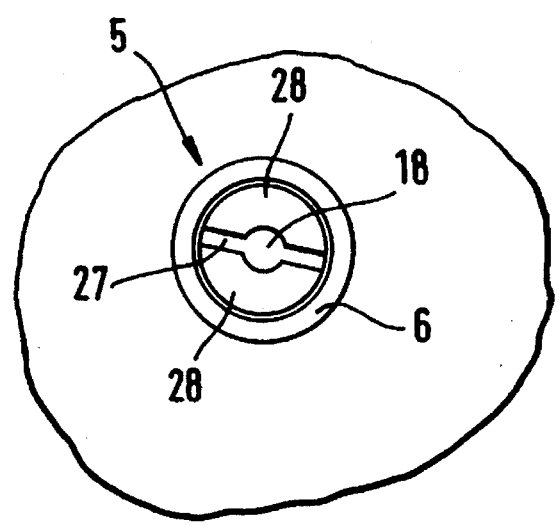
FIG. 4 is a plan view of the outer end of the pipe stub.

The pipe stub 5 has an outer, radial flange 8 at its end 4 disposed in the interior space 9 of the tank. The flange 8 defines the end face of the end 4 of the pipe stub 5. The annular surface or end face facing away from the pipe stub 5 defines a sealing surface 12 of a valve seat 10. A valve body 11 is assigned to the valve seat 10 and, in the embodiment shown, the valve body is configured as an arcuate valve plate 13. The concave side 14 of the valve plate 13 faces toward the valve seat 10 and carries an approximately perpendicular central attachment lug 15 which, in turn, has a bead-like thickening 16 at a spacing to the valve plate 13. The thickening 16 can, for example, be configured as a kind of ball joint. The segment 17 between the thickening 16 and the mushroom-shaped valve plate 13 is disposed in a circularly-shaped receptacle 18. This receptacle 18 is conjointly delimited by two inner component ring flanges 28 (FIG. 4) which are directly behind the plane of the sealing surface 12. The component ring flanges 28 lie opposite each other in a plane and also delimit a pass-through gap 27 for the ambient air flowing in when the valve is open. The receptacle 18 is arranged in such a manner that the axial segment 17 is axially clamped in the longitudinal direction of the attachment lug 15 whereby the valve plate 13 is held with its outer edge 19 liquid-tight against the sealing surface 12 of the valve seat 10.

The free end segment of the attachment lug 15 which extends from the thickening 16 tapers slightly in the direction toward its free end. This free end lies approximately at the elevation of the tank wall 7 when the valve body 11 is mounted.

Figure 3:
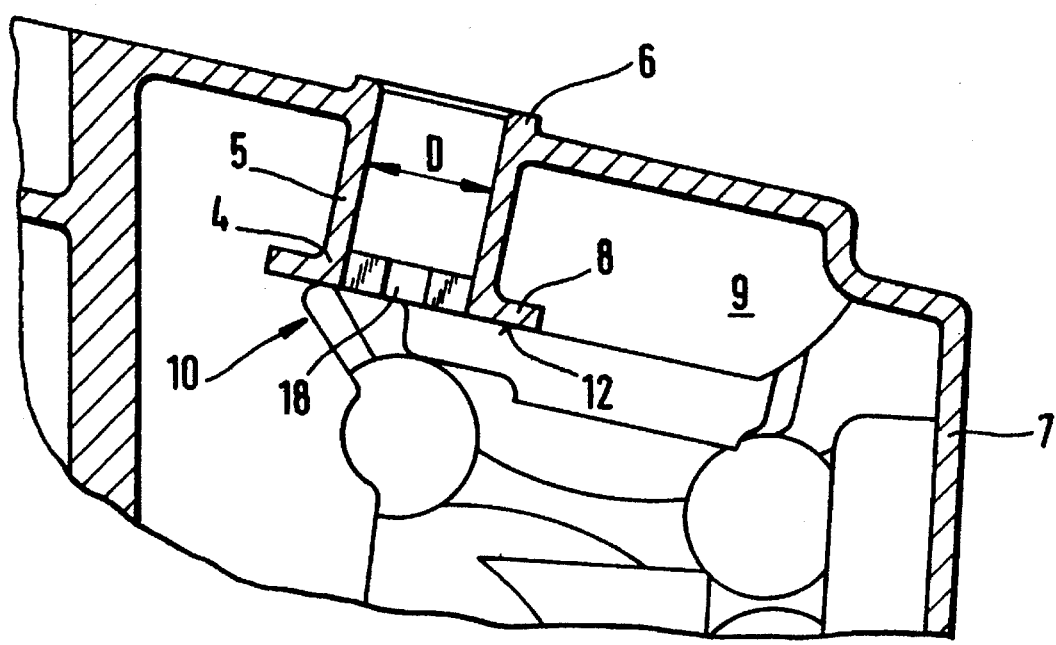
FIG. 3 is a section view taken through the pipe stub provided for receiving the venting valve.

As shown in FIG. 3, the pipe stub 5 has an inner diameter D which is substantially greater than the diameter of the attachment lug 15 (FIG. 2) so that one can reach into the pipe stub 5 with a work tool for mounting the valve body 11. The attachment lug 15 is inserted through the receptacle 18 from the interior of the tank and is grasped with a pair of pliers or the like within the pipe stub 5 and pulled toward the outside whereby the thickening 16 is forced through the receptacle 18 in order to fix the valve body 11 in the pipe stub 5. The valve body 11, that is the valve plate 13, is made of elastic material as is the attachment lug 15. This elastic material can, for example, be rubber and it is for this reason that the thickening 16 can be pulled through the receptacle 18, which is smaller, by applying a reasonable force. The receptacle 18 is located precisely centrical directly behind the end face of the pipe stub 5 which determines the sealing surface 12.

After mounting the valve body 11, the other, open end 6 of the pipe stub is closed by inserting a cylindrical hollow plug 20. The plug 20 is configured to have a cup-like shape and has a slight oversize compared to the inner diameter D of the pipe stub 5 so that the plug 20 is fixed in a form-tight manner in the pipe stub 5 by axial insertion. The plug 20 comprises a sinter material permeable to air and this material has a pore size which is approximately 100 μm. The sinter material is advantageously made of a plastic such as polyethylene or the like.

Figure 5:
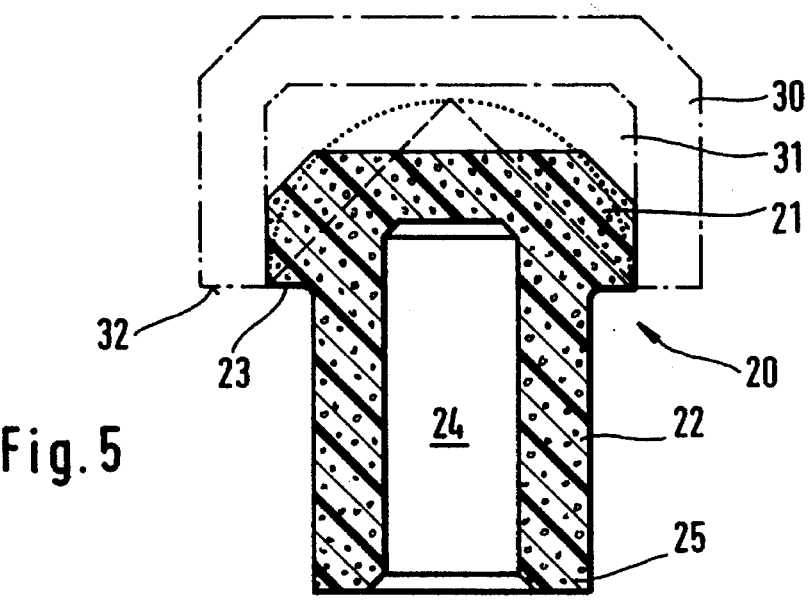
FIG. 5 is a section view taken through an air filter insertable into the pipe stub.

The plug 20 has at its one end a head 21 which, in the embodiment shown, is configured in the manner of a truncated cone. The head 21 of the plug can advantageously have a partially sphere-shaped or cone-shaped configuration to provide a larger filter surface. This is represented in FIG. 5 by the broken line. The head 21 has an outer diameter greater than the shaft 22 of the plug 20. This provides a step 23 which delimits the axial insertion depth of the plug 20. In the embodiment shown in FIG. 2, the peripherally extending annular-shaped step 23 is in contact engagement with the end 6 of the pipe stub 5 which projects slightly above the tank wall 7.

The cylindrical centrally disposed hollow space 24 of the plug 20 is open to the free interior lying end 25 of the lug 15 and defines a receiving space for the attachment lug 15 which projects thereinto.

The venting valve configured in this manner opens exclusively in the interior space 9 of the fuel tank so that ambient air can flow in to compensate for pressure when an underpressure occurs. The air filter configured as a closure plug 20 guarantees that no dirt particles can enter which could become seated between the valve plate 13 and the valve seat 10 which, in turn, could otherwise lead to leakage. The venting valve then permits the inflow of ambient air while preventing an outflow of the fuel.

If, under extreme operating conditions, fuel should nonetheless pass through the air filter, then a filter cap 30 (FIG. 5) can be advantageous which engages over the plug 20 and covers the same with respect to the ambient air. The end face 32 of the mounted filter cap 30 then lies approximately in a plane with the annular step 23 of the air filter head 21 which lies in contact engagement with the end 6 of the pipe stub 5. The inflowing air is shown by arrows 26 in FIG. 2. This inflowing air must therefore first flow through the filter cap 30 and then through the air filter 20. The filter cap 30 performs the function of a prefilter and is preferably made of the same sinter material as the air filter 20.

The filter cap 30 and the head 21 of the air filter 20 conjointly define a hollow space 31 which functions as a collecting space for fuel which may flow out. This fuel vaporizes in the leakage space 31 and is returned to the interior space of the tank by the inflowing ambient air with the next occurring pressure compensation. In this way, fuel which has diffused into the sinter material can also be returned.

It is understood that the foregoing description is that of the preferred embodiments of the invention and that various changes and modifications may be made thereto without departing from the spirit and scope of the invention as defined in the appended claims.

What is claimed is:

1. A venting valve for a fuel tank of a work apparatus such as a chain saw driven by an internal combustion engine, the fuel tank having a tank wall and defining an interior and the venting valve comprising:

a valve seat mounted so as to face into said interior of said tank and defining a sealing surface;

a valve body mounted so as to be movable between an open position wherein said interior communicates with the ambient so as to permit air to flow in a flow direction from the ambient into said interior and a closed position wherein said valve body is in seal-tight contact engagement with said sealing surface and said interior is sealed off from the ambient;

a finely porous air filter mounted in said tank forward of said valve seat when viewed in said flow direction;

said valve seat is mounted in said interior and said valve body is mounted so as to move in a direction toward said interior of said tank when moving from said closed position into said open position;

said valve body being mounted in said interior of said tank;

a pipe stub having first and second open ends; and, said pipe stub being mounted at said first end on said tank wall and said second end defining said sealing surface; and, said air filter being inserted into said first end of said pipe stub.

2. The venting valve of claim 1, said pipe stub being formed so as to define a single piece with said tank wall.

3. The venting valve of claim 1, said air filter being inserted force-tight into said first end of said pipe stub.

4. The venting valve of claim 1, said air filter having a cylindrical portion inserted into said pipe stub and a head portion on said cylindrical portion.

5. The venting valve of claim 4, said cylindrical portion being hollow and said head portion being configured as a half sphere.

6. The venting valve of claim 4, said cylindrical portion being hollow and said head portion being configured as a truncated cone.

7. The venting valve of claim 4, further comprising a filter cap mounted over said head portion.

8. The venting valve of claim 7, said filter cap and said head portion conjointly delimiting a hollow space therebetween.

9. The venting valve of claim 7, said air filter and/or said filter cap being made of an air-permeable sinter material.

10. The venting valve of claim 9, said air-permeable material being plastic having a pore size of approximately 100 µm.

11. The venting valve of claim 1, said valve body including: holder means for mounting said valve body in said interior; and, an elastic, arcuate valve plate connected to said holder means and said valve plate having a concave side facing toward said sealing surface.

12. The venting valve of claim 11, said valve body being made of rubber.

13. The venting valve of claim 11, said holder means being a lug extending centrically and approximately perpendicularly from said concave side; and, attaching means for attaching said lug to said second end of said pipe stub.

14. The venting valve of claim 13, said attachment means including a bead-like thickening coacting with said second end to hold said valve body on said pipe stub.

15. The venting valve of claim 14, said bead-like thickening and said valve plate conjointly defining a lug segment therebetween; said attachment means including receiving means formed in said second end of said pipe stub for engaging and holding said lug segment between said thickening and said valve plate.

16. The venting valve of claim 15, said lug segment being held in said receiving means so as to be axially tensioned therein.

* * * * *